US012770044B2

(12) United States Patent
Prati et al.

(10) Patent No.: US 12,770,044 B2
(45) Date of Patent: Oct. 20, 2026

(54) COMPUTER IMPLEMENTED METHOD FOR REAL TIME QUANTUM COMPILING BASED ON ARTIFICIAL INTELLIGENCE

(71) Applicants: CONSIGLIO NAZIONALE DELLE RICERCHE, Rome (IT); POLITECNICO DI MILANO, Milan (IT)

(72) Inventors: Enrico Prati, Rome (IT); Lorenzo Moro, Milan (IT); Marcello Restelli, Milan (IT)

(73) Assignees: CONSIGLIO NAZIONALE DELLE RICERCHE, Rome (IT); POLITECNICO DI MILANO, Milan (IT)

( * ) Notice: Subject to any disclaimer, the term of this patent is extended or adjusted under 35 U.S.C. 154(b) by 608 days.

(21) Appl. No.: 18/550,667

(22) PCT Filed: Mar. 16, 2022

(86) PCT No.: PCT/IB2022/052359

§ 371 (c)(1),
(2) Date: Sep. 14, 2023

(87) PCT Pub. No.: WO2022/195494

PCT Pub. Date: Sep. 22, 2022

(65) Prior Publication Data

US 2024/0169237 A1 May 23, 2024

(30) Foreign Application Priority Data

Mar. 16, 2021 (IT) ........................ 102021000006179

(51) Int. Cl.
*G06N 10/20* (2022.01)
*G06N 3/092* (2023.01)

(52) U.S. Cl.
CPC ............. *G06N 10/20* (2022.01); *G06N 3/092* (2023.01)

(58) Field of Classification Search
CPC ............................... G06N 10/20; G06N 3/092
See application file for complete search history.

(56) References Cited

U.S. PATENT DOCUMENTS 12,456,068 B1 * 10/2025 Ho ......................... G06N 10/60
2018/0276014 A1 9/2018 Kliuchnikov
(Continued)

FOREIGN PATENT DOCUMENTS

WO 2019152020 A1 8/2019

OTHER PUBLICATIONS

Lu—Quantum Adversarial Machine Learning—2020 (Year: 2020).*
(Continued)

*Primary Examiner* — Omar F Fernandez Rivas
*Assistant Examiner* — Shamcy Alghazzy
(74) *Attorney, Agent, or Firm* — Merchant & Gould P.C.

(57) ABSTRACT

A computer implemented method for real time quantum compiling includes a unitary matrix, representing a single-qubit or multi-qubit quantum operation implemented by a quantum computer, to a machine-learning trained algorithm. Information representing a base of quantum gates for building a quantum circuit corresponding to unitary matrix operation, a tolerance parameter, and processing termination information are provided to the algorithm. A quantum circuit is determined including the combination of base quantum gates. The determining is based on a policy encoded in the algorithm by reinforced learning training. Finally, information is provided on the determined quantum circuit, as a result of the real time quantum compiling. The reinforced learning training phase is based on a Reinforced Learning procedure. The Reinforced Learning procedure includes
(Continued)

defining an unbiased set of training target unitary matrices, defining training base sets of quantum gates, and executing episodes of the Reinforced Learning procedure.

20 Claims, 4 Drawing Sheets

(56) References Cited

U.S. PATENT DOCUMENTS

| | | | | |
|---|---|---|---|---|
| 2020/0169396 | A1* | 5/2020 | Neven | B82Y 10/00 |
| 2020/0320240 | A1* | 10/2020 | Parrish | G06F 17/11 |

OTHER PUBLICATIONS

International Search Report and Written Opinion received for PCT Serial No. PCT/IB2022/052359 on Jul. 12, 2022, 27 pgs.

Yuan-Hang Zhang, et al: "Topological Quantum Compiling with Reinforcement Learning", arxiv.org, Cornell University Library, 201 Olin Library Cornell University Ithaca, NY 14853, Oct. 21, 2020 (Oct. 21, 2020), XP081791460, DOI: 10.1103/PHYSREVLETT.125.170501, p. 1-p. 4; p. 7-p. 10; Figures 1-3.

He Zhimin et al: "Variational quantum compiling with double Q-learning", New Journal of Physics, vol. 23, No. 3, Mar. 5, 2021 (Mar. 5, 2021), p. 033002, XP055870765, DOI: 10.1088/1367-2630-abe0ae. Retrieved from the internet. URL: https://iopscience.iop.org/article10. 1088/1367-2630/abe0ae/pdf [Retrived on Dec. 9, 2021]—Abstract; Sections 1-4, Figures 1, 2, 8.

Sohaib Alam M: "Quantum Logic Gate Synthesis as a Markov Decision Process", arxiv.org, Cornell University Library, 201 Olin Library Cornell University Ithaca, NY 14853, Dec. 27, 2019 (Dec. 27, 2019), XP081566549, abstract; [p. 1-p. 4; p. 6-p. 9.].

Moro Lorenzo et al: "Optical Manipulation of Qubits by Deep Reinforcement Learning", OSA Quantum 2.0 Conference, Sep. 14, 2020 (Sep. 14, 2020), pp. 1-2, XP055870655, Washington D.C., DOI: 10.1364/QUANTUM.2020.QM6A.4. ISBN: 978-1-943580-81-1. Retrieved from the Internet: URL: https//www.osapublishing.org/DirectPDFaccess/B1FD4DE5-DDEE-4AAF-AE6AF9BDFADFCAD0_442169/QUANTUM-2020-QM6A.4.pdf?da=1&id=442169&uri=QUANTUM-2020-QM6A&seq=0&mobile=no [Retrieved on Dec. 9, 2021]. The whole document.

Aram W. Harrow et al: "Efficient Discrete Approximations of Quantum Gates", arxiv.org, Cornell University Library, 201 Olin Library Cornell University Ithaca, NY 14853, Jul. 11, 2002 (Jul. 11, 2002), XP080067101, DOI: 10.1063/1.1495899. Abstract; Sections 1-5.

Kitaev, A. Y. "Quantum computations: algorithms and error correction". Russian Mathematical Surveys 52, 1191-1249 (1997).

Zhiyenbayev, Y., Akulin, V. & Mandilara, A. "Quantum compiling with diffusive sets of gates", Physical Review A 98, 012325 (2018).

Dawson, C. M. & Nielsen, M. A. "The Solovay-Kitaev algorithm", arXiv preprint quantph/0505030 (2005).

Russell, N. J., Chakhmakhchyan, L., O'Brien, J. L. & Laing, A. "Direct dialling of Haar random unitary matrices". New Journal of Physics 19, 033007 (2017).

Linke, N. M. et al. "Experimental comparison of two quantum computing architectures", Proceedings of the National Academy of Sciences 114, 3305-3310 (2017).

Debnath, S. et al. "Demonstration of a small programmable quantum computer with atomic qubits", Nature 536, 63 (2016).

Maslov, D. "Basic circuit compilation techniques for an ion-trap quantum machine", New Journal of Physics 19, 023035 (2017).

Nielsen, M. A. & Chuang, I. "Quantum computation and quantum information" (2002).

Tolar, J. "On Clifford groups in quantum computing". In Journal of Physics: Conference Series, vol. 1071, 012022 (IOP Publishing, 2018).

Andrychowicz, M. et al. "Hindsight experience replay". In Advances in Neural Information Processing Systems, 5048-5058 (2017).

Watkins, C. "Learning from delayed rewards" (1989).

Schulman, J., Wolski, F., Dhariwal, P., Radford, A. & Klimov, O. "Proximal policy optimization algorithms" arXiv preprint arXiv:1707.06347 (2017).

Sutton, R. S., Barto, A. G. et al. "Introduction to reinforcement learning", vol. 135 (MIT press Cambridge, 1998).

Osband, I., Blundell, C., Pritzel, A. & Van Roy, B. "Deep exploration via bootstrapped DQN", in Advances in neural information processing systems, 4026-4034, 2016.

* cited by examiner

COMPUTER IMPLEMENTED METHOD FOR REAL TIME QUANTUM COMPILING BASED ON ARTIFICIAL INTELLIGENCE

CROSS-REFERENCE TO THE RELATED APPLICATIONS

The present application is a National Stage Filing of PCT International Application No. PCT/IB2022/052359 filed on Mar. 16, 2022, which claims priority to Italian Patent Application No. 102021000006179 filed on Mar. 16, 2021, both of which applications are incorporated herein by reference in their entirety.

FIELD OF APPLICATION

The present invention relates to a computer implemented method for quantum compiling based on artificial intelligence.

The general technical field of the present invention is quantum computing and, in particular, quantum compiling for quantum computing.

More specifically, the invention refers to a computer implemented method for real time quantum compiling based on reinforced learning techniques.

DESCRIPTION OF THE PRIOR ART

Quantum computation takes place, at its lowest level, through the transformation of quantum systems, mathematically grounded on unitary matrices acting on the state of n-qubits, where the quantum information is encoded. However, gate-model quantum computers can in practice perform a limited number of transformations only, due to noise and to constraints in their architecture.

Therefore, in gate-model quantum computers, the computation is achieved as circuits of quantum gates, that are ordered sequences of unitary matrices (i.e., "unitaries"), acting on a few qubits at once.

Although the Solovay-Kitaev theorem (Kitaev, A. Y. "Quantum computations: algorithms and error correction". *Russian Mathematical Surveys* 52, 1191-1249 (1997)) ensures that any computations can be approximated, within an arbitrary tolerance, as a circuit (i.e., a quantum circuit) starting from a finite set of operators, there is no optimal strategy to establish how to compute such sequence. This problem is known as "quantum compiling" and the algorithms to compute suitable approximating circuits as quantum compilers.

Every quantum compiler has a different trade-off between the length of the sequences (that should be shorter as possible), the precompilation time (i.e., the time taken by the algorithm to be ready for use) and the execution time (i.e., the time the algorithm takes to return the sequence)—about this aspect, see for example Zhiyenbayev, Y., Akulin, V. & Mandilara, A. "Quantum compiling with diffusive sets of gates", *Physical Review A* 98, 012325 (2018).

Existing quantum compilers are characterized by high execution and precompilation time (as can be noted for example in the above mentioned paper Zhiyembayev et al., or even in Dawson, C. M. & Nielsen, M. A. "The Solovay-Kitaev algorithm", arXiv preprint quantph/0505030 (2005)), which makes unpractical to compute it during online operations.

Recently, artificial intelligence techniques have been proposed to support quantum computing.

For example, deep learning has been successfully applied to physics, where unprecedented advancements have been achieved by combining reinforcement learning with deep neural networks into deep reinforcement learning (DRL). Deep reinforcement learning, thanks to its ability to identify strategies for achieving a goal in intricate configuration spaces without prior knowledge of the system, has recently been proposed for the control of quantum systems.

Moreover, it has proven to be effective as a control framework to optimize the speed and the fidelity of quantum computation and in quantum gates control.

In such a context, the Applicants previously applied deep reinforcement learning to control and initialise qubits by continuous pulse sequences for coherent transport by adiabatic passage (CTAP) and by digital pulse sequences for stimulated Raman passage (STIRAP), respectively.

However, as noted above, artificial intelligence and deep learning have been applied, up to now, mainly to the physical implementation of a determined quantum gate (for example, refer to the International Patent Application WO 2019/152020). Therefore, the above mentioned known solutions cannot solve satisfactorily the problem of identifying a quantum compiling strategy, given a certain quantum operation to be carried out.

The above mentioned technical problem, and the related needs that are particularly felt in the considered technical field, are not solved, up to now, in a satisfactory manner.

SUMMARY OF THE INVENTION

It is the object of the present invention to provide a computer implemented method for real time quantum compiling, which allows to solve, at least partially, the drawbacks described above with reference to the prior art and respond to the aforesaid needs particularly felt in the technical field under consideration.

It is a further object of the present invention to provide a computer implemented method for performing quantum computing, based on the aforesaid computer implemented method for real time quantum compiling.

It is also an object of the present invention to provide a system capable to carry out the abovementioned methods, and a computer-readable storage medium comprising instructions that allows to carry out the abovementioned methods.

Another object of the present invention to provide a quantum computing system, exploiting the above-described computer implemented method.

BRIEF DESCRIPTION OF THE DRAWINGS

Further features and advantages of the method and system according to the invention will become apparent from the following description of preferred embodiments, given by way of indicative, non-limiting examples, with reference to the accompanying drawings, in which.

DETAILED DESCRIPTION

Figure 1:
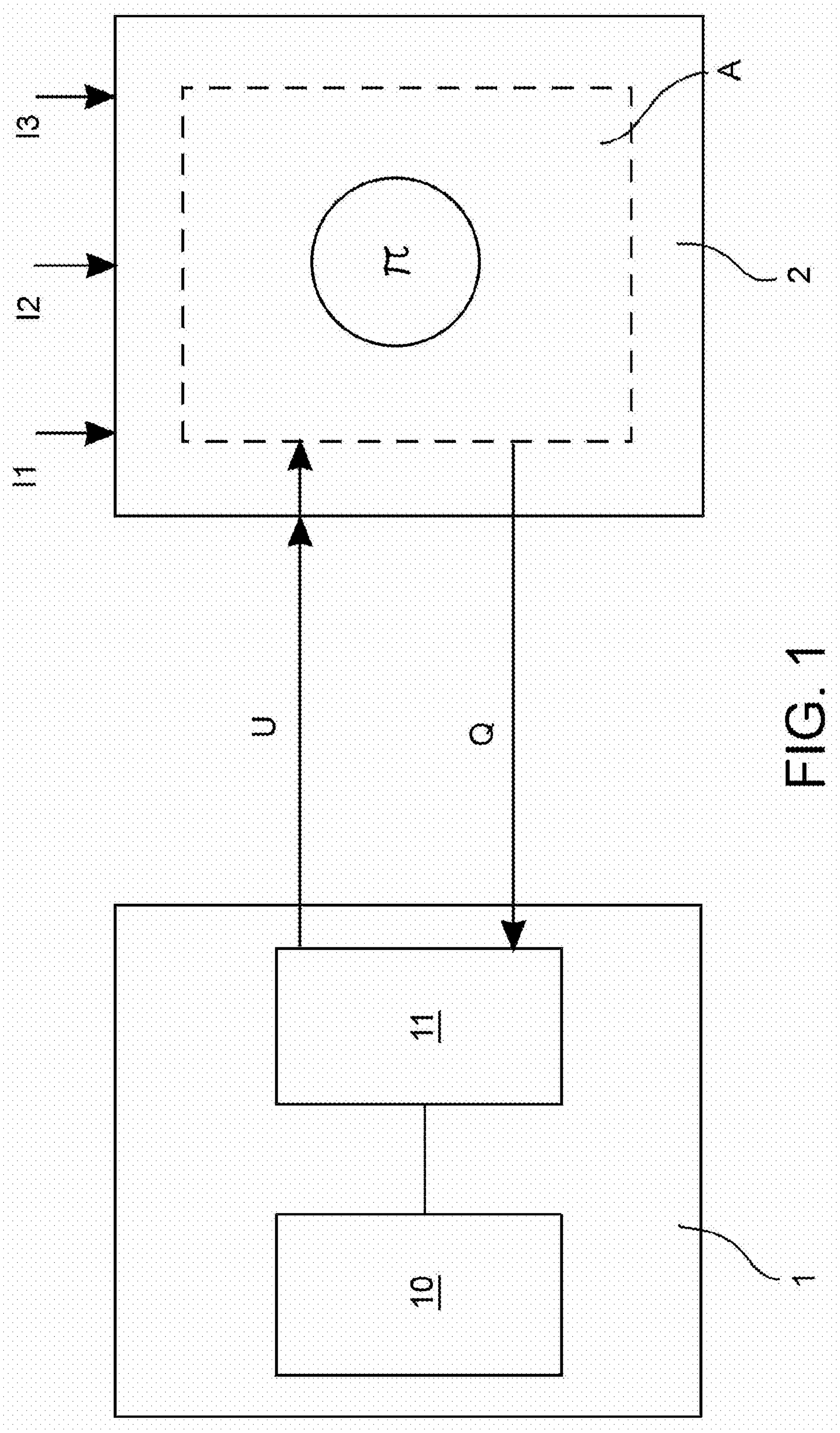
FIG. 1 is a simplified block diagram illustrating an embodiment of a quantum computing system configured to carry out the computer implemented method for real time quantum compiling of the present invention.

A computer implemented method for real time quantum compiling is described, making reference to the FIGS. 1-4.

The computer implemented method comprises the step of providing a unitary matrix U, representing a single-qubit or multi-qubit quantum operation to be carried out by a quantum computer 1, to a machine-learning trained algorithm A.

The method then comprises providing to the aforesaid machine-learning trained algorithm A an information I1 representing a base of quantum gates to be used as basic elements to build a quantum circuit corresponding to the operation of said unitary matrix U, within a given tolerance; and also providing the machine-learning trained algorithm A with a tolerance parameter I2, representative of the given tolerance, and with a processing termination information I3, representative of a criterion to determine the end of the processing by the algorithm.

The method further comprises determining a quantum circuit corresponding to the operation of the unitary matrix U, within the given tolerance and according to the processing termination information. The quantum circuit comprises the combination of a number of the aforesaid base quantum gates.

This step of determining is carried out by the machine-learning trained algorithm A, based on a policy π encoded in the machine-learning trained algorithm A by means of a reinforced learning training phase, performed before and independently of the real time quantum compiling.

The fact that the reinforced-learning-based training phase is executed "before and independently with respect to the real time quantum compiling" means that, at the moment of applying the algorithm to the quantum compiling for a specific quantum operation to be carried out in real time, the algorithm already incorporates in itself a well-defined policy π, which has been encoded during a previous training phase, that has been already performed and completed.

The method finally comprises the step of providing, as a result of the real time quantum compiling, a quantum circuit description information Q describing the determined quantum circuit in terms of the aforesaid combination of base quantum gates.

The above-mentioned reinforced learning training phase is carried out based on a Reinforced Learning procedure.

The Reinforced Learning procedure comprises defining an unbiased set of training target unitary matrices, defining one or more training base sets of quantum gates, and executing multiple episodes of said Reinforced Learning procedure. Each episode is executed having as target a respective one of the unitary matrices of the training target set of unitary matrices, and using a respective one of the training base sets of quantum gates.

The above-mentioned unbiased set of training target unitary matrices randomly represents target points in the unitary matrices space defined by the special unitary group SU(2N), where N is the number of the qubits involved in the quantum operation to be performed. SU(2N) indicates, according to a well-known mathematical definition, the special unitary group of degree 2N, i.e., the Lie group of 2Nn×2N unitary matrices having determinant 1.

Each episode of the above-mentioned Reinforced Learning procedure, in the training phase, comprises applying a reinforcement learning model to iteratively adjust a current approximating quantum circuit by actions decided by an agent, on the basis of a matrix representing the operation of the current approximating quantum circuit and based on a reward function.

According to an implementation option, the above-mentioned processing termination information I3 comprises an indication of the maximum number of quantum gates to be used to build said quantum circuit. In this case, the criterion to determine the end of the processing comprises building a quantum circuit formed by a number of said base quantum gates that is smaller than or equal to predefined maximum number of quantum gates.

According to other implementation options, the above-mentioned processing termination information I3 comprises a signal event that terminates an episode of the processing by the trained algorithm, or an information about a maximum allowed processing time (e.g., a timeout information).

According to an embodiment of the method, the step of defining an unbiased set of training target unitary matrices comprises defining an unbiased set of training target unitary matrices in such a way (i.e., based on the criterion) that the probability of selecting a unitary matrix from a given region in the space of all unitary matrices is directly proportional to the volume of the region itself.

According to an embodiment of the method, the unitary matrix is a 2×2 unitary matrix representing a single-qubit quantum operation. In this case, the determined quantum circuit comprises a sequence of a plurality of base single-qubit quantum gates having a length smaller than or equal to said maximum number of quantum gates.

According to an embodiment of the method, two-qubits quantum operations are implemented by unitary 4×4 matrices. The determined quantum circuit comprises a sequence of a plurality of one-qubit and two-qubits base quantum gates having a length smaller than or equal to a respective maximum number of quantum gates.

According to an embodiment of the method, N-qubits quantum operations are implemented by unitary $2^N \times 2^N$ matrices. The determined quantum circuit comprises a sequence of a plurality of one-qubit and two-qubits base quantum gates having a length smaller than or equal to a respective maximum number of quantum gates.

According to an embodiment of the method, the machine-learning trained algorithm is represented by a multi-layer neural network.

According to an implementation option, the neural network comprises at least two hidden layers, so that it constitutes a deep neural network. In this case, the above-mentioned Reinforcement Learning procedure is therefore a Deep Reinforcement Learning procedure.

According to an implementation example, the number of neurons of each hidden layer of the neural network is equal than or lower than 128.

According to an embodiment of the method, the aforesaid unbiased set of training target unitary matrices is a set of Haar random unitaries.

In fact, the strategy used to generate the training data set should be chosen wisely, depending on the particular set of gates of interest, since deep neural networks are very susceptible both to the range and to the distribution of the inputs, respectively. Therefore, in this embodiment, Haar random unitaries have been used as targets.

Pictorially, picking a Haar unitary matrix from the space of unitaries can be thought as choosing a random number from a uniform distribution (reference can be made, for example, to Russell, N. J., Chakhmakhchyan, L., O'Brien, J. L. & Laing, A. "Direct dialling of Haar random unitary matrices". *New Journal of Physics* 19, 033007 (2017)). Thus, the probability of selecting a particular unitary matrix from some region in the space of all unitary matrices is directly proportional to the volume of the region itself.

These matrices form an unbiased data set which is ideal to train neural networks.

According to an embodiment of the method, the above mentioned reward function represents a distance of the current approximating circuit from the target unitary matrix.

According to another embodiment of the method, the reward function is equal to a negative constant number.

Further details about the reward function will be provided in a subsequent part of this description.

According to an embodiment of the method, the aforesaid training base sets of quantum gates comprises a set of six rotational unitary matrices representing respective positive and negative rotations, by a given rotation quantity, around the one respective of the three axis of the Bloch sphere.

According to an implementation example, the rotational quantity is π/128 radiant.

According to another embodiment of the method, the aforesaid training base sets of quantum gates comprises a HRC universal base of quantum gates (i.e., Harrow-Recht-Chuang, HRC, efficiently universal gates).

Referring now to the base of quantum gates, actually used during the real time quantum compiling, according to an embodiment of the method, the base of single-qubit quantum gates comprises a set of rotational unitary matrices.

According to another embodiment of the method, the base of quantum gates comprises a set of HRC universal base of quantum gates.

For example, the HRC universal base of quantum gates comprises the following matrices (representing respective base quantum gates):

$$V_1 = \frac{1}{\sqrt{5}}\begin{pmatrix} 1 & 2i \\ 2i & 1 \end{pmatrix} \quad V_2 = \frac{1}{\sqrt{5}}\begin{pmatrix} 1 & 2 \\ -2 & 1 \end{pmatrix} \quad V_3 = \frac{1}{\sqrt{5}}\begin{pmatrix} 1+2i & 0 \\ 0 & 1-2i \end{pmatrix}$$

According to other possible embodiments of the method, the base of quantum gates comprises a set of quantum gates different from said training base sets of quantum gates.

According to an embodiment of the method, the base of 2-qubit quantum gates comprises one of the mentioned single qubit sets with one or more 2-qubits gate producing entanglement on the two input qubits.

For example, the mentioned 2-qubit quantum gates are a CNOT gate or a Dxx gate.

According to a method implementation option, the given tolerance is equal to or greater than 0.9 average gate fidelity.

According to some possible method implementation options, the maximum number of quantum gates is lower than 300, or lower than 200, or lower than 100.

As noted above, one embodiment of the method provides executing a Deep Reinforced Learning procedure, in the training phase, i.e., applying a reinforcement learning model to iteratively adjust a current approximating quantum circuit by actions decided by an agent, on the basis of a matrix representing the operation of the current approximating quantum circuit and of a reward function representing a distance of the current approximating quantum circuit from the target unitary matrix.

According to an implementation option, the aforesaid action decided by the agent comprises the addition of a selected one of the base quantum gates to the current quantum circuit, to obtain an updated quantum circuit.

According to an implementation option, the step of applying a reinforcement learning model comprises, for each iteration, the following steps:

determining, by the agent, the addition of a selected one of the base quantum gates to the current quantum circuit based on an observation matrix, representing the operation of the current quantum circuit considered in the current iteration, and based on a reward function, and obtaining an updated quantum circuit for the next iteration;

calculating, by a training environment, for the next iteration, an updated observation matrix, representing the operation of the updated quantum circuit, and an updated reward function;

providing the updated observation matrix and the updated reward function to the agent for the next iteration.

The above mentioned implementation option, therefore, provides the possibility to update also the training of the algorithm, in an evolutionary way, taking into account the specific quantum compilation to be carried out (the quantum compilation continues when the further step of algorithm training is completed).

According to an implementation option, the agent comprises, or is implemented through, a training neural network.

In this case, determining an action by the agent comprises: providing, as input to the training neural network, a vector of values representing said observation matrix; and providing by the agent, as output, a vector of parameter values representing the action.

The training neural network encodes a policy for quantum compiling in its hidden layers neurons, and the policy to be applied for real time quantum compiling is the policy encoded in the training neural network at the end of the training phase.

According to an embodiment of the method, the Deep Reinforced Learning is carried out by means of the Deep Q-Learning, DQL, algorithm.

According to another embodiment of the method, the Deep Reinforced Learning is carried out by means of the Proximal Policy Optimization, PPO, algorithm.

Further details on the method will be provided hereafter, referring to some examples of implementation of the method, provided not to limit the invention, but only to illustrate it in a more detailed way.

Regarding the Deep Reinforcement Learning techniques, adopted in some embodiments of the method, the following remarks are provided.

Deep reinforcement learning is a subset of machine learning that exploits deep neural networks to learn optimal policies in order to achieve specific goals in decision-making problems. Such techniques can be remarkably effective in high-dimensional control tasks and to address problems where limited or no prior knowledge of the configuration space of the system is available.

The fundamental assumptions and concepts in the reinforcement learning theory are built upon the idea of continuous interactions between a decision-maker called agent and a controlled system named environment, typically defined in the form of a Markov decision process (MDP). The former interacts with the latter at discrete time-steps, performing an action based on an observation related to the current state of the environment, in accordance to a policy function that fully determines its behaviour.

Therefore, the environment evolves changing its state and returns a reward signal, that can be interpreted as a measure of the adequateness of the action the agent has performed.

The only purpose of the agent is to learn a policy to maximise the reward over time.

The learning procedure can be a highly time-consuming task, but, in this method, it has to be performed just once. Then, it is possible to exploit the policy, that is encoded in the deep neural network, with low computational resources in minimal time.

In the framework of quantum compiling, according to the method of the invention, here described, for example, with reference to a single-qubit quantum operation, the agent is asked to approximate any single-qubit unitary matrix U within a fixed tolerance ε, as compositions of elements $A_j$ chosen from a universal set of gates B.

$$U_n = \prod_{j=1}^{n} A_j$$

Figure 2:
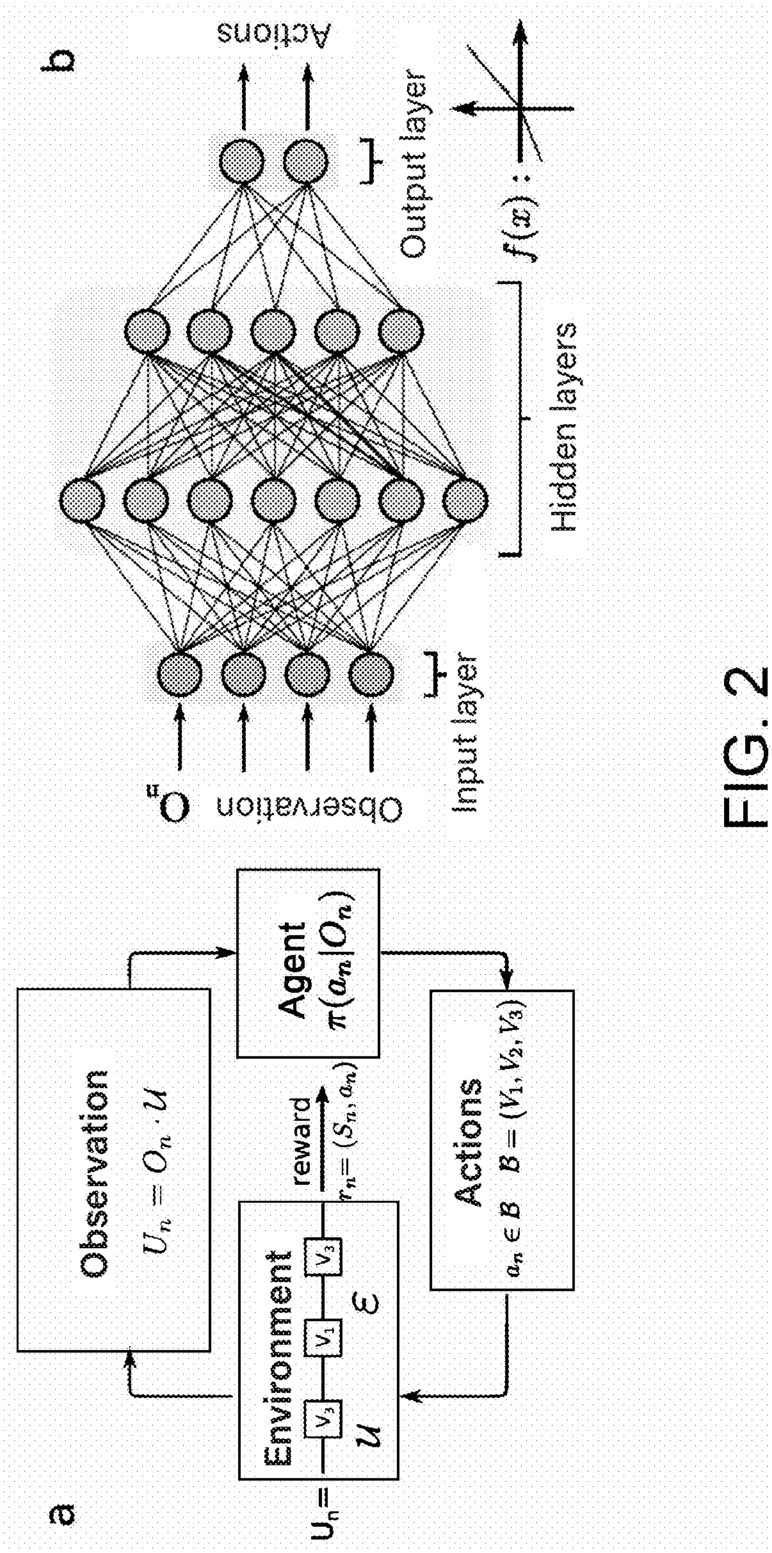
FIG. 2 illustrates a deep reinforcement learning architecture used in a step of an embodiment of the method according to the present invention.

The environment can be imagined as a quantum circuit, that at the beginning of each episode starts with no gates applied and it is built incrementally at each time step by the agent, choosing a gate from B in accordance to the policy encoded in the deep neural network, as shown in FIG. 2.

Therefore, the available actions that the agent can perform correspond to the gates in the base B.

The observation used as input at time n corresponds to the vector of the real and imaginary parts elements of the matrix On, where U=Un·On.

Such representation encodes all the information needed by the agent to build a suitable approximating sequence of gates, i.e., the current composition of gates and the unitary target to approximate.

In this example, no information on the tolerance is given to the agent since it is fixed, and thus it can be learned indirectly during the training.

FIG. 2 illustrates the deep reinforcement learning (DRL) architecture, which is adopted in one of the embodiments of the invention.

In FIG. 2(*a*), the DRL environment is described as a quantum circuit modelled by the approximating sequence Un, the fixed tolerance ε, and the unitary target to approximate U, that generally changes at each episode. At each time-step n the agent receives the current observation On and based on such information it chooses the next gate to apply on the quantum circuit. Moreover, the environment returns the real-valued reward value $r_n$ to the agent.

In FIG. 2(*b*), it is shown that the agent policy is encoded in a deep neural network, DNN. At each time-step, the DNN receives as input a vector made by the real and imaginary part of the observation On. Such information is processed by the hidden layers and returned through the output layer. The neurons in the output layer are associated with the action the agent will perform in the next time-step. In the bottom-right corner is reported an example of the non-linear activation function RELU.

According to an implementation option of the method, the reward function is a dense reward function.

According to another implementation option of the method, the reward function is a sparse reward function, exploiting a HER (Hindsight Experience Relay) technique.

Designing a suitable reward function is remarkably challenging, potentially leading to unexpected or unwanted behaviour if not defined accurately. Therefore, in two implementation examples of the method, two reward functions have been designed depending on the different characteristics of the base of gate considered, which can be identified as quasi-continuous-like sets of small rotations and discrete sets, respectively.

The former are inspired by gates available on superconductive and trapped ions architecture; regarding this aspect, the following papers can be considered as references:

- Linke, N. M. et al. "Experimental comparison of two quantum computing architectures", *Proceedings of the National Academy of Sciences* 114, 3305-3310 (2017), or
- Debnath, S. et al. "Demonstration of a small programmable quantum computer with atomic qubits", *Nature* 536, 63 (2016), or
- Maslov, D. "Basic circuit compilation techniques for an ion-trap quantum machine", *New Journal of Physics* 19, 023035 (2017).

The latter are standard set of logic gates, typically used to write quantum algorithms, e.g., the Clifford+T library (Nielsen, M. A. & Chuang, I. "Quantum computation and quantum information" (2002); Tolar, J. "On Clifford groups in quantum computing". In *Journal of Physics: Conference Series,* vol. 1071, 012022 (IOP Publishing, 2018).

The corresponding reward functions are, respectively:

$$\text{(dense reward)}\quad r(S_n, a_n) = \begin{cases} (L-n)+1 & \text{if } d(U_n, \mathcal{U}) < \epsilon \\ -d(U_n, \mathcal{U})/L & \text{otherwise} \end{cases}$$

$$\text{(sparse reward)}\quad r(S_n, a_n) = \begin{cases} 0 & \text{if } d(U_n, \mathcal{U}) < \epsilon \\ -1/L & \text{otherwise} \end{cases}$$

where L is the maximum length of the episode and d(Un; U) is the distance between the target and the approximating sequence at time n.

Both reward functions are negative at each time-step, so that the agent will prefer shorter episodes.

The former is a "sparse reward" (binary reward), i.e., it lowers the reward of the agent equally for every action it takes, bringing no information to the agent on how to find the solution. Therefore, it requires advanced exploration techniques to be effective, such as Hindsight Experience Replay (HER)—refer, for example, to Andrychowicz, M. et al. "Hindsight experience replay". In *Advances in Neural Information Processing Systems,* 5048-5058 (2017).

The latter performs adequately if small rotations are used as base only.

As already noted, both Deep Q-Learning (DQL) algorithm (see for example Watkins, C. "Learning from delayed rewards" (1989)), and Proximal Policy Optimization (PPO) algorithm (see for example Schulman, J., Wolski, F., Dhariwal, P., Radford, A. & Klimov, O. "Proximal policy optimization algorithms" arXiv preprint arXiv: 1707.06347 (2017)) are exploited, in different possible embodiments of the method, to train the agents, depending on the reward function. Such algorithms differs in many aspects, as will be described later in this description.

Intuitively, the former is mandatory if the sparse reward is used, since HER technique requires an off-policy methods to be exploited, while the latter is more robust and easy to tune.

Many RL problems may be efficiently addressed using sparse rewards only, since engineering efficient and well-shaped reward functions can be extremely challenging. Such rewards are binary, i.e., the agent receives a constant signal until it solves the task. However, if the agent gets the same reward almost every time, it cannot learn any relationships of cause and effect that its actions have on the environment. Therefore, it might take an extremely long time to learn something, if anything.

Hindsight Experience Replay (HER) is a technique introduced by OpenAI that allows overcoming the sparse-reward problem (see e.g., Andrychowicz, M. et al. "Hindsight experience replay", in *Advances in Neural Information Processing Systems,* 5048-5058 (2017)).

The basic idea of HER is to exploit the ability that human have to learn from failure. More precisely, even if the agent failed to solve the task, it was able to reach a different one. Therefore, it is possible to exploit this information to help the agent to learn. Although it receives some reward signal to reach a different goal from the original one, this procedure, if iterated, can help the agent to learn how to achieve the task we want to solve.

The implementation of HER with Q-learning is very straightforward. After an entire episode is completed, the experiences associated with that episode are modified selecting a new goal. Then, the q-function is updated as usual. There are several strategies to choose the goals as shown in Andrychowicz, M. et al. "Hindsight experience replay", in *Advances in Neural Information Processing Systems,* 5048-5058 (2017). The proposed strategy to select the new goals consists of randomly selecting k-percent of the states which come from the same episode.

In the following paragraphs, further details on two machine learning algorithms (i.e., Q-learning and Proximal Policy Optimization) that are used in respective embodiments of the method are provided.

The Q-learning algorithm greatly simplifies the learning process of policy iteration (see for example Sutton, R. S., Barto, A. G. et al. "Introduction to reinforcement learning", vol. 135 (MIT press Cambridge, 1998)), keeping its fundamental structures. The basic idea is to determine an action-state value function called q-function q(s; a), then the policy π is selected as:

$$\pi'(s) = \mathrm{argmax}\, q_\pi(s; a).$$

The algorithm is defined by the following update rule for the q-function:

$$q(s_t, a_t) \leftarrow q(s_t, a_t) + \alpha\left[r_{t+1} + \gamma \max_a q(s_{t+1}, a) - a(s_t, a_t)\right]$$

where α, γ, s, a, r are the learning rate, the discount rate, the state of the environment, the action taken by the agent and the reward received, respectively.

The rule uses all of the elements in the quadruple ($s_t$; $a_t$; $r_{t+1}$; $s_{t+1}$) that is called experience.

This algorithm ensure the convergence of q to the optimal q-function q*.

Q-learning is an off-policy method, i.e., it estimates the value of the policy, but it does not use it for control. The policy that defines the behaviour of the agent is called "behaviour" policy, while the policy that is evaluated and improved "target" policy. The advantages of this approach are that the latter can be deterministic and the former does not need to be updated at every interaction with the environment.

For instance, the experiences can be saved and stored in an "experience replay buffer" and used to update in later stages of training.

However, it is necessary to convergence that the behaviour policy continues to explore all state-action pairs. This is a mild requirement, in the sense that every algorithm that finds optimal behaviour must require it. This exploration can be achieved using several strategies, such as ε-greedy or bootstrapping (Osband, I., Blundell, C., Pritzel, A. & Van Roy, B. "Deep exploration via bootstrapped DQN", in *Advances in neural information processing systems,* 4026-4034, 2016).

Proximal Policy Optimization (PPO) is a policy gradient algorithm, developed by OpenAI (see Schulman, J., Wolski, F., Dhariwal, P., Radford, A. & Klimov, O. "Proximal policy optimization algorithms" arXiv preprint arXiv: 1707.06347 (2017)).

The starting point is the expected discounted reward η(π):

$$\eta(\pi) = \left\langle \sum_t^{+\infty} \gamma^t r_t \right\rangle$$

where γ is the discount factor and $r_t$ the reward at time t.

The basic idea is to modify the policy π to improve η. To do that, it is useful to define an "advantage function":

$$A_\pi(s, a) = q_\pi(s, a) - v_\pi(s)$$

where $q_\pi$ and $v_\pi$ are the action-state function and the value function. The advantage can be interpreted as a measure of how much better is to take an action a respect to all other possible actions, if the environment is in the state s.

It can be proved that $$\rho_{\pi'}(S) = p(s_0 = s) + \gamma p(s_1 = s) + \gamma^2 p(s_2 = s) + \ldots \text{ where}$$

$$\eta(\pi') = \eta(\pi) + \sum_s \rho_{\pi'}(s) \sum_a \pi'(a \mid s) A_\pi(s, a)$$

are the discounted visitation frequencies. This relation is central. In fact, if the policy π' is better than π, i.e., leads to better performance, then has a non-negative expected advantage for every action α.

The task of optimizing the above reported relation to improve the policy may be very complex due to the unknown relation between ρ and π'.

To overcome this problem, Proximal Policy Optimization is used, in an implementation option by optimizing a different function, i.e.:

$$L_\pi(\pi') = \langle \min(R_\pi(\pi') A_\pi, \mathrm{clip}[R_\pi, 1-\varepsilon, 1+\varepsilon] A_\pi) \rangle$$

where $R_\pi = \pi'/\pi$ is the ratio between the probability of a given action under the new policy and the probability under the current policy. Instead, the clipping function limits the values of the ratio in the interval [1−ε; 1+ε] where ε is a real number usually set at 0.2.

It is proven that $L_\pi$ and η(π) matches at first order. Therefore, if $L_\pi$ is optimised, then η(π) is improved.

In the following part of the description some examples of training neural networks for approximating a single-qubit gate are provided, making reference to FIGS. 2 and 3.

Firstly, the problem of decomposing a single-qubit gate, into a circuit of unitary transformations, that can be implemented directly on quantum hardware, is considered.

The adopted base of gates corresponds to six small rotations of π/128 around the three-axis of the Bloch sphere, i.e.:

$$\mathcal{B} = \left(R_{\hat{x}}\left(\pm\frac{\pi}{128}\right), R_{\hat{y}}\left(\pm\frac{\pi}{128}\right), R_{\hat{z}}\left(\pm\frac{\pi}{128}\right)\right)$$

It is important to choose the tolerance ε and the fixed target accurately to appreciate the learning procedure. The tolerance ε should be small enough and the fixed target sufficiently far from the identity not to been solved by chance. However, if the target is too difficult or even impossible to approximate, the agent will fail and no learning occurs. To be sure that at least one solution does exist, the matrix U is built as a composition of 87 elements selected from B. The resulting unitary target, for the training phase, is:

$$\mathcal{U} = \begin{pmatrix} 0.76749896 - 0.43959894i & -0.09607122 + 0.45658344i \\ 0.09607122 + 0.456583344i & 0.76749896 + 0.43959894i \end{pmatrix}$$

In this example, the problem is addressed exploiting a DQL agent, using the same thresholds for the tolerance and the dense reward, and according to the parameters reported in the following table.

TABLE 1

List of the hyperparameters and their values used in the fixed-target problem.

| Area related | Hyperparameter | Value |
|---|---|---|
| Neural Network | # hidden layers | 128, 128 |
| | activations | SELU, SELU, linear |
| | initializers | lecun, lecun, glorot |
| Training | optimizer | Adam |
| | learning rate | 0.0005 |
| | batch size | $10^3$ |
| | training frequency | every 1 episode |
| Algorithm | epsilon decay | 0.99976 |
| | memory size | $10^4$ experiences |
| | max length episode | 130 |

Figure 3:
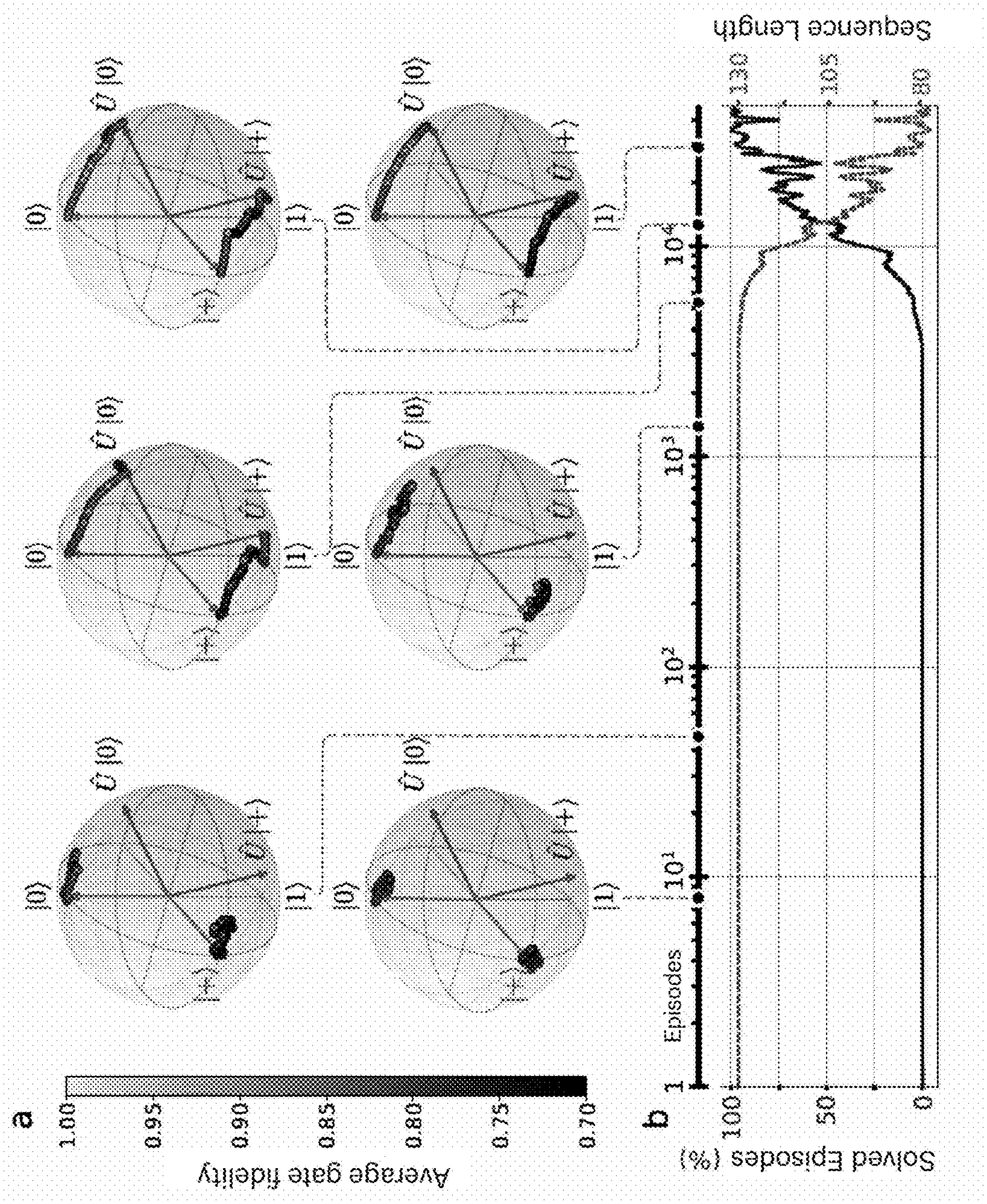
FIG. 3 shows performances and solutions of a training phase, according to an embodiment of the method according to the present invention.

FIG. 3 shows the performance and the solutions found by the agent during the training time. The agent learns how to approximate the target after about $10^4$ episodes, continuing to improve the solution over time. At the end of the learning, the agent discovered an approximating circuit made by 76 gates only, within the tolerance requested.

In FIG. 3(*a*), the best sequences of gates discovered by the agent during the training at different epochs are shown. The timestamps indicate the time at which they were found for the first time. Each approximating sequence is represented by two trajectories of states (black points) on the Bloch sphere. They are obtained by applying the unitary transformations associated with the circuit at the time-step n on two representative states, namely $|0\rangle$ and $|+\rangle$ respectively. The agent is asked to transform the starting state (green arrows) in the corresponding ending state (red arrows), i.e., respectively, $$|0\rangle \text{ to } \mathcal{U}|0\rangle \text{ and } |+\rangle \text{ to } \mathcal{U}|+\rangle.$$

In FIG. 3(*b*), the performance of the agent during training is shown. The plot represents the percentage of episodes for which the agent was able to find a solution (continuous line, starting low) and the average number of the sequence of gates (dotted line, starting high). The agent learns how to approximate the target after about $10^4$ episodes. Next, it continues to improve the solution over time.

A key feature of the present method is the idea of exploiting the knowledge of a trained agent to approximate any single-qubit unitary transformation, without requiring additional training.

In this manner, the DRL approach can be generalized to the quantum compilation of a larger class of two or more qubits unitary transformations.

For this purpose, in the example here described, Haar unitary matrices are used as training targets, since they form an unbiased and a general data set which is ideal to train neural networks.

If additional information on the type and distribution of targets is known, it is possible to choose a different set of gates for training, potentially increasing the performance of the agent.

Approximating any single-qubit unitary transformation is a tougher task to solve compared to the fixed-target one.

Therefore, in this case, the Proximal Policy Optimization algorithm (PPO) is exploited, being more robust and easy to tune than DQL. The tolerance ε is fixed at 0.99 AGF and the maximum length of the approximating circuits (time-step per episode) is limited at 300 gates.

Further details on the parameters used to solve this problem are reported in the following table 2:

TABLE 2

List of the hyperparameters and their values used in the PPO problem.

| Area related | Hyperparameter | Value |
|---|---|---|
| Neural Network | # hidden layers | 128, 128 |
| | activations | SELU, SELU |
| Training | learning rate | 0.0001 |
| | batch size | 128 |
| | agents | 40 |
| Algorithm | max length episode | 300 |

Figure 4:
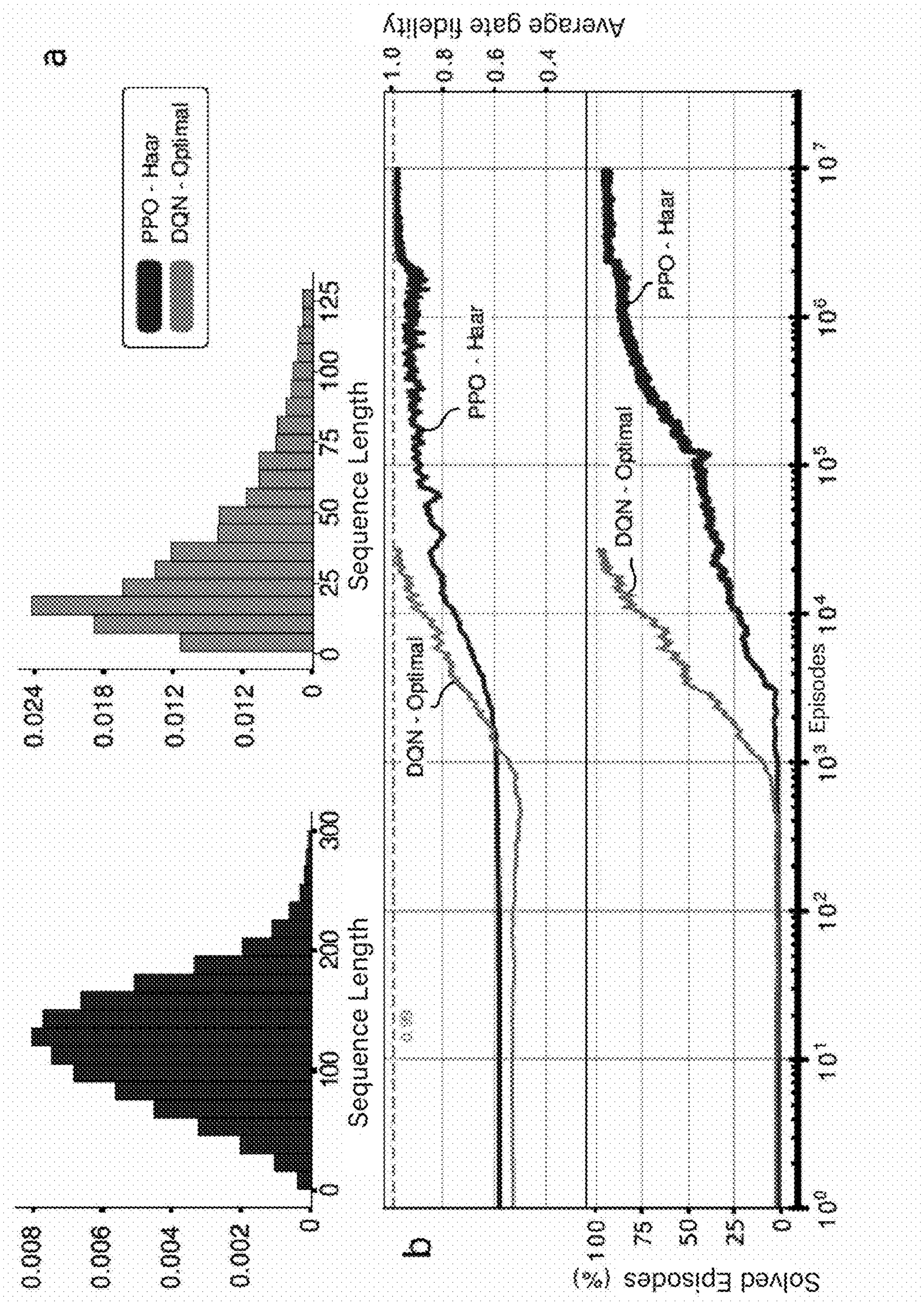
FIG. 4 shows performances and solutions of a training phase, according to another embodiment of the method according to the present invention.

In FIG. 4, the results obtained by training a PPO agent (dark grey) and a DQN+HER agent (light grey) to approximate single-qubit unitaries using two different base of gates, i.e. six small rotations of π/128 around the three-axis of the Bloch sphere and the HRC efficient base of gates, respectively. The tolerance was fixed to 0.99 average gate fidelity.

In FIG. 4(*a*), the length distributions of the gates sequences discovered by the agents at the end of the learning are shown. The HRC base generates shorter circuits as expected.

FIG. 4(*b*) shows the performance of the agent during the training time. The agent starts to approximate unitaries after $10^5$ episodes, but it requires much more time to achieve a satisfactory performance.

The performance of the agents has been tested at the end of the learning, using a validation set of $10^6$ Haar unitary targets. The agent is able to approximate more than 96% of the targets within the tolerance requested.

Regarding the example using the HRC universal base of quantum gates, already defined above, the following further remarks are provided.

The unitary matrices composing the HRC universal base of quantum gates implement quantum transformations that are very different from the ones performed by small rotations. The agent has to learn how to navigate in the high-dimensional space of unitary matrices, exploiting counter-intuitive movements that could lead it close to the target at the last time-step of the episode only.

Therefore, in this case, the dense reward function is no longer useful to guide the agent towards the targets. However, it is possible to exploit the sparse reward function thanks to HER technique.

A DQL agent has been chosen to address the problem. The tolerance $\varepsilon$ has been fixed at 0.99 AGF and the maximum length of the approximating circuits has been limited at 130 gates. FIG. 4 shows the performance of the agent during the training time (FIG. 4(*b*), where dark grey lines refer to PPO-Haar agent and light grey lines refer to DQN agent) and the length distribution of the solved sequences obtained using a validation set of $10^6$ Haar random unitaries (FIG. 4(*a*)). The agent solved roughly more than 95% of the targets, using on average less than 36 gates.

In Appendix 1, detailed results related to examples of approximated quantum gates, obtained by virtue of the method of the invention, are reported.

According to an embodiment, the method provides the further step of implementing the quantum circuit determined by the quantum compilation in a quantum computation device.

A computer implemented method for performing quantum computing is here described.

This method comprises the steps of determining. by a quantum computer or in the context of a quantum computation, a single-qubit or multi-qubit quantum operation to be carried out, represented by a respective unitary matrix; then, providing said unitary matrix to a machine learning trained algorithm.

The method then provides carrying out a computer implemented method for real time quantum compiling according to any one of the previously described embodiments.

The method finally comprises the steps of providing the information on the determined quantum circuit, obtained as a result of the real time quantum compiling, to the quantum computer, and implementing the determined quantum circuit and executing the quantum operation, by the quantum computer.

A system is here described, comprising one or more computers and one or more storage devices storing instructions that are operable, when executed by the one or more computers, to cause the one or more computers to perform operations comprising the methods of any one of the previously described embodiments.

There is here described a computer-readable storage medium comprising instructions stored thereon that are executable by a processing device and upon such execution cause the processing device to perform operations comprising the method of any one of the previously described embodiments.

A quantum computing system, also comprised in the invention and exploiting the above described computer implemented method for real time quantum compiling, is hereafter described.

The quantum computing system includes a quantum computer 1, comprising a control unit 11 and a quantum computation unit 10, and a quantum compiler electronic processor 2.

The control unit 11 of the quantum computer 1 is configured to generate a unitary matrix U, representing a single-qubit or multi-qubit quantum operation to be carried out by the quantum computation unit 10, and is further configured to act on the quantum computation unit 10 to generate a single-qubit or multi-qubit quantum circuit based on a received quantum circuit description information Q describing the quantum circuit in terms of a combination of base quantum gates. The generated quantum circuit is suitable to implement the desired quantum operation, represented by the aforesaid unitary matrix U.

The quantum computation unit 10 is configured to implement the quantum circuit, under the control of the control unit 11, and to perform the single-qubit or multi-qubit quantum operation by means of the quantum circuit.

The quantum compiler electronic processor 2 is configured to receive the unitary matrix U from the control unit 11 of the quantum computer, and to receive input information (I1, I2, I3) which comprises: an information representing a base of quantum gates I1 to be used as basic elements to build the quantum circuit, within a given tolerance; a tolerance parameter I2, representative of such a given tolerance; a processing termination information I3.

The quantum compiler electronic processor 2 is further configured to carry out a computer implemented method for real time quantum compiling, according to any of the method embodiments described above, based on a machine-learning trained algorithm A.

The quantum compiler electronic processor 2 is also configured to provide the control unit 11 of the quantum computer 1 with the above mentioned quantum circuit description information Q describing the determined quantum circuit in terms of a combination of base quantum gates.

The aforesaid machine-learning trained algorithm A operates on the basis of a policy $\pi$ for the generation of quantum circuits which is encoded in the machine-learning trained algorithm A by means of a reinforced learning training phase, performed before and independently of the real time quantum compiling.

In different embodiments of the system, the reinforced learning training phase is carried out according to any of the possible manners above described in this disclosure.

It is worthwhile noting that, although in the embodiment shown in FIG. 1 the quantum compiler electronic processor 2 receives the unitary matrix U from the control unit 11 of the quantum computer, and receives the input information I1, I2, I3 from other sources (for example, a user, or another software program, or another processor), other possible embodiments of the system provide any combination of arrangements in which any of the unitary matrix U and/or the input information I1, I2, I3 is generated (and provided to the quantum compiler electronic processor 2) by any source among the control unit 11 of the quantum computer and the above mentioned other sources (e.g., a user, or another software program, or another processor, and so on).

According to an embodiment of the system, the aforesaid control unit 11 of the quantum computer and electronic processor operating as quantum compiler 2 can be implemented by means of classical (not quantum) hardware, i.e., according to implementation solutions, per se known, of quantum computation devices.

It should be noticed that the object of the present invention is fully achieved by the method described above by virtue of its functional features.

Deep learning is used to solve the problem that existing quantum compilers are characterised by high execution and precompilation time, which makes unpractical to compute it during online operations.

By exploiting a deep reinforcement learning algorithm, the method can successfully train an agent, so to generalize how to map any unitary operator into a sequence of elementary gates, within an arbitrary precision.

Although a deep neural network quantum compiler is characterised by an high precompilation time, the precompilation procedure is performed once, in a training phase carried out before the real time compilation.

Writing the map into the deep neural network, as provided by the method, enables to call on demand quantum compilers, considerably decreasing the execution time and therefore allowing online dynamical programming on a gate-model quantum computer.

In summary, the method proposes a novel approach to quantum compiling, exploiting deep reinforcement learning to approximate, with competitive tolerance, single-qubit or multi-qubit operation as circuits made by an arbitrary initial set of elementary quantum gates.

It should be noted that, in the method and system of the present invention, the algorithm trained by Reinforced Learning techniques and, in some embodiments, Deep Reinforced Learning, plays a central and essential role, in the sense that it is precisely the algorithm trained by reinforcement learning that carries out the quantum compilation, that is, it determines a quantum circuit corresponding to the quantum operation to be performed. This aspect is also decisive in ensuring one of the main technical advantages of the invention, that is, a compilation in real time, when the already trained algorithm is available.

The aforementioned characteristic also clearly distinguishes the method and system of the present invention from some different solutions, in which training techniques by means of reinforcement learning can be used for mere support or auxiliary functions, in the context of a quantum compilation based on traditional known planning algorithms, which do not allow to obtain a quantum compilation in real time, and therefore do not reach the aforementioned technical effect and do not provide the aforementioned advantage of use that are offered by the method and by the system according to the present invention.

Some prominent examples have been shown to illustrate how to steer quantum compiling for small rotations of π/128 around the three-axis of the Bloch sphere and for the HRC universal gates, by employing two alternative DRL algorithms depending on the nature of the base.

It has been shown that, at the end of the learning, the agents are able to generate single-qubit logic circuits within a competitive tolerance of 0:99 average-gate fidelity (AGF). The strategy we used consists in generating uniform distributions of single-qubit unitary matrices and used them as training targets. The agents are not told how to approximate such targets, but instead they are asked to learn a suitable policy to complete the task. The final performances of all agents are then measured using a validation set of unitary matrices not previously seen by the agent.

The DRL agents prove to capture the intricate structure of the unitary matrices space, discovering approximating circuits of unitary single-qubit operation and providing a viable approach to perform real-time quantum compiling, once trained the neural network.

In order to meet contingent needs, those skilled in the art can make changes and adaptations to the embodiments of the method and system described above, and can replace elements with others which are functionally equivalent, without departing from the scope of the following claims. All the features described above as belonging to a possible embodiment may be implemented irrespective of the other embodiments described.

APPENDIX 1

0.5. Examples of approximated gates. We explicitly reported the approximating circuits built by the agents after the training, for some well-known gates. For the sake of compactness, we indicate $$R_1 = R_{\hat{x}}\left(\frac{\pi}{128}\right),\ R_2 = R_{\hat{y}}\left(\frac{\pi}{128}\right),\ R_3 = R_{\hat{z}}\left(\frac{\pi}{128}\right),$$

$$R_4 = R_{\hat{x}}\left(\frac{-\pi}{128}\right),\ R_5 = R_{\hat{y}}\left(\frac{-\pi}{128}\right) \text{ and } R_6 = R_{\hat{z}}\left(\frac{-\pi}{128}\right).$$

0.5.1. Agent 1. The PPO agent trained using composition of small rotations presented in the supplementary material, approximated the Hadamard gate H as a circuit U of 200 gates chosen from the base $$\mathcal{B} = \left(R_{\hat{x}}\left(\pm\frac{\pi}{128}\right),\ R_{\hat{y}}\left(\pm\frac{\pi}{128}\right),\ R_{\hat{z}}\left(\pm\frac{\pi}{128}\right)\right)$$

with a final tolerance of 0.99993 AGF.

$$H \sim U = \begin{pmatrix} -0.00557949 + 0.70572137i & 0.00807513 + 0.70842149i \\ -0.00807513 + 0.70842149i & -0.00557949 - 0.70572137i \end{pmatrix}.$$

The sequence of gates is $$\begin{aligned} U = {} & R_4 \cdot R_5 \cdot R_3 \cdot R_4 \cdot R_5 \cdot R_3 \cdot R_4 \cdot R_5 \cdot R_5 \cdot R_4 \cdot R_5 \cdot R_5 \cdot R_4 \cdot R_5 \cdot R_5 \cdot \\ & R_4 \cdot R_3 \cdot R_5 \cdot R_5 \cdot R_3 \cdot R_5 \cdot R_5 \cdot R_5 \cdot R_4 \cdot R_3 \cdot R_5 \cdot R_5 \cdot R_5 \cdot R_4 \cdot R_5 \cdot R_5 \cdot \\ & R_5 \cdot R_5 \cdot R_4 \cdot R_4 \cdot R_4 \cdot R_5 \cdot R_5 \cdot R_5 \cdot R_3 \cdot R_3 \cdot R_3 \cdot R_3 \cdot R_4 \cdot R_3 \cdot R_3 \cdot R_5 \cdot \\ & R_5 \cdot R_5 \cdot R_5 \cdot R_4 \cdot R_5 \cdot R_4 \cdot R_5 \cdot R_5 \cdot R_5 \cdot R_5 \cdot R_5 \cdot R_4 \cdot R_5 \cdot R_4 \cdot R_5 \cdot R_4 \cdot R_5 \cdot \\ & R_4 \cdot R_4 \cdot R_4 \cdot R_4 \cdot R_3 \cdot R_4 \cdot R_4 \cdot R_4 \cdot R_4 \cdot R_3 \cdot R_4 \cdot R_4 \cdot R_4 \cdot R_4 \cdot R_4 \cdot R_4 \cdot R_4 \cdot \\ & R_4 \cdot R_3 \cdot R_4 \cdot R_4 \cdot R_4 \cdot R_4 \cdot R_4 \cdot R_4 \cdot R_3 \cdot R_4 \cdot R_4 \cdot R_4 \cdot R_4 \cdot R_4 \cdot R_4 \cdot R_4 \cdot R_3 \cdot \\ & R_3 \cdot R_4 \cdot R_4 \cdot R_4 \cdot R_4 \cdot R_4 \cdot R_4 \cdot R_3 \cdot R_4 \cdot R_4 \cdot R_4 \cdot R_4 \cdot R_4 \cdot R_4 \cdot R_3 \cdot R_4 \cdot R_3 \cdot \\ & R_4 \cdot R_3 \cdot R_4 \cdot R_4 \cdot R_3 \cdot R_3 \cdot R_4 \cdot R_3 \cdot R_3 \cdot R_3 \cdot R_3 \cdot R_4 \cdot R_3 \cdot R_3 \cdot R_3 \cdot R_3 \cdot R_3 \cdot \\ & R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot \\ & R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot \\ & R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot \\ & R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3. \end{aligned}$$

The agent is able to approximate the X gate (NOT) exactly using 128 gates applying $R_3$ 128 times.

0.5.2. Agent 2. The PPO agent trained using Haar random matrices, approximate the Hadamard gate H using 183 gates with a final tolerance of 0.99 AGF.

$$H \sim U = \begin{pmatrix} 0.08467609 - 0.664967i & 0.06948855 - 0.73879644i \\ -0.06948855 - 0.73879644i & 0.08467609 + 0.664967i \end{pmatrix}.$$

The sequenee of gates is $$
\begin{aligned}
U = {} & R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_3 \cdot R_5 \cdot R_5 \cdot \\
& R_5 \cdot R_5 \cdot R_5 \cdot R_5 \cdot R_5 \cdot R_5 \cdot R_5 \cdot R_5 \cdot R_5 \cdot R_5 \cdot R_5 \cdot R_5 \cdot R_5 \cdot R_5 \cdot R_5 \cdot R_5 \cdot \\
& R_5 \cdot R_5 \cdot R_5 \cdot R_5 \cdot R_5 \cdot R_5 \cdot R_5 \cdot R_5 \cdot R_5 \cdot R_5 \cdot R_5 \cdot R_5 \cdot R_5 \cdot R_5 \cdot R_5 \cdot R_5 \cdot \\
& R_5 \cdot R_5 \cdot R_1 \cdot R_1 \cdot R_5 \cdot R_5 \cdot R_5 \cdot R_1 \cdot R_5 \cdot R_5 \cdot R_1 \cdot R_5 \cdot R_1 \cdot R_1 \cdot R_1 \cdot R_5 \cdot R_1 \cdot \\
& R_5 \cdot R_5 \cdot R_5 \cdot R_5 \cdot R_5 \cdot R_5 \cdot R_5 \cdot R_1 \cdot R_1 \cdot R_5 \cdot R_5 \cdot R_1 \cdot R_5 \cdot R_1 \cdot R_1 \cdot R_1 \cdot R_5 \cdot \\
& R_1 \cdot R_5 \cdot R_1 \cdot R_1 \cdot R_5 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot \\
& R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot \\
& R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot \\
& R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot \\
& R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot R_1 \cdot \\
& R_1 \cdot R_1 \cdot R_1 \cdot R_1 \cdot R_1 \cdot R_1 \cdot R_1 \cdot R_1 \cdot R_2 \cdot R_2 \cdot R_2 \cdot R_2 \cdot R_1 \cdot R_2 \cdot R_2 \cdot R_5 \cdot R_1.
\end{aligned}
$$

The agent is able to approximate the X gate (NOT) exactly using 128 gates applying $R_3$ 128 times.

0.5.3. Agent 3. The DQN agent approximate the Hadamard H using 22 gates with an average gate fidelity of 0.9975.

$$
H \sim U = \begin{pmatrix} -0.01649752 + 0.74698842i & -0.00523932 + 0.66461168i \\ 0.00529932 + 0.66461168i & -0.01649752 - 0.74698842i \end{pmatrix}
$$

The sequence of gates is $U = V_2 \cdot V_2 \cdot V_2 \cdot V_1 \cdot V_3 \cdot V_3 \cdot V_2 \cdot V_3 \cdot V_3 \cdot V_3 \cdot V_3 \cdot V_3 \cdot V_3 \cdot V_3 \cdot V_3 \cdot V_3 \cdot V_2 \cdot V_1 \cdot V_2 \cdot V_2 \cdot V_1 \cdot V_3$.

The agent approximate the X gate (NOT) using 16 gates with an average gate fidelity of 0.9978.

$$
X \sim U = \begin{pmatrix} 0.00738765 + 0.02718515i & 0.04931994 - 0.99838566i \\ -0.04931994 - 0.998838566i & 0.00738765 - 0.02718515i \end{pmatrix}
$$

The sequence is $U = V_2 \cdot V_2 \cdot V_2 \cdot V_3 \cdot V_1 \cdot V_1 \cdot V_3 \cdot V_3 \cdot V_1 \cdot V_1 \cdot V_1 \cdot V_2 \cdot V_1 \cdot V_1 \cdot V_3 \cdot V_1 \cdot V_1$.

The invention claimed is:

1. A computer implemented method for real time quantum compiling, comprising:

providing a unitary matrix, representing a single-qubit or multi-qubit quantum operation to be carried out by a quantum computer, to a machine-learning trained algorithm;

providing to said machine-learning trained algorithm an information representing a base of quantum gates to be used as basic elements to build a quantum circuit corresponding to operation of said unitary matrix, within a given tolerance;

providing said machine-learning trained algorithm with a tolerance parameter, representative of said given tolerance, and with processing termination information, representative of a criterion to determine an end of processing by the algorithm;

determining a quantum circuit corresponding to the operation of said unitary matrix, within the given tolerance and according to said processing termination information, said quantum circuit comprising a combination of said base quantum gates;

wherein the step of determining is carried out by said machine-learning trained algorithm, based on a policy encoded in the machine-learning trained algorithm by a reinforced learning training phase, performed before and independently of the real time quantum compiling;

providing, as a result of the real time quantum compiling, a quantum circuit description information describing the determined quantum circuit in terms of said combination of base quantum gates;

wherein said reinforced learning training phase is carried out based on a Reinforcement Learning procedure and comprises:

defining an unbiased set of training target unitary matrices, which randomly represent target points in a unitary matrices space defined by the special unitary group SU(2N), where N is the number of the qubits involved in the quantum operation to be performed;

defining one or more training base sets of quantum gates;

executing multiple episodes of said Reinforcement Learning procedure, each episode being executed having as a target a respective one of the unitary matrices of said training target set of unitary matrices, and using a respective one of said training base sets of quantum gates;

wherein each episode of said Reinforced Learning procedure, in the training phase, comprises:

applying a reinforcement learning model to iteratively adjust a current approximating quantum circuit by actions decided by an agent, based on a matrix representing the operation of the current approximating quantum circuit based on a reward function.

2. The method according to claim 1, wherein said processing termination information comprises an indication of a maximum number of quantum gates to be used to build said quantum circuit, and wherein said criterion to determine the end of the processing comprises building a quantum circuit formed by a number of said base quantum gates that is smaller than or equal to said maximum number of quantum gates.

3. The method according to claim 1, wherein said processing termination information comprises a signal event that terminates an episode of the processing by the trained algorithm, or information about a maximum allowed processing time.

4. The method according to claim 1, wherein the step of defining an unbiased set of training target unitary matrices comprises defining an unbiased set of training target unitary matrices based on the criterion that a probability of selecting a unitary matrix from a given region in the space of all unitary matrices is directly proportional to a volume of the region.

5. The method according to claim 1, wherein:

the unitary matrix is a 2×2 unitary matrix representing a single-qubit quantum operation;

said determined quantum circuit comprises a sequence of a plurality of base single-qubit quantum gates having a length smaller than or equal to said maximum number of quantum gates, or wherein:

the unitary matrix is a $2^N \times 2^N$ unitary matrix representing an N-qubit quantum operation;

said determined quantum circuit comprises a sequence of a plurality of base single-qubit and two-qubits quantum gates having a length smaller than or equal to a respective predetermined maximum number of quantum gates.

6. The method according to claim 1, wherein the machine-learning trained algorithm is represented by a multi-layer neural network, and wherein the neural network comprises at least two hidden layers, so that the neural network comprises a deep neural network, and said Reinforcement Learning procedure is therefore a Deep Reinforcement Learning procedure.

7. The method according to claim 6, wherein a number of neurons of each hidden layer of the neural network is equal to or lower than 128.

8. The method according to claim 6, wherein said unbiased set of training target unitary matrices is a set of Haar random unitaries.

9. The method according to claim 1, wherein the reward function represents a distance of the current approximating circuit from the target unitary matrix, or wherein the reward function is equal to a negative constant number.

10. The method according to claim 1, wherein said one or more training base sets of quantum gates comprises a set of six rotational unitary matrices representing respective positive and negative rotations, by a given rotation quantity, around the one respective of three axes of a Bloch sphere.

11. The method according to claim 1, wherein said training base sets of quantum gates comprises a HRC universal base of quantum gates.

12. The method according to claim 1, wherein said base of quantum gates comprises a set of rotational unitary matrices or a set of HRC universal base of quantum gates.

13. The method according to claim 9, wherein said base of quantum gates comprises a set of quantum gates different from said training base sets of quantum gates.

14. The method according to claim 1, wherein said action decided by the agent comprises addition of a selected one of the base quantum gates to the current quantum circuit, to obtain an updated quantum circuit, wherein applying a reinforcement learning model comprises, for each iteration:

determining, by the agent, the addition of a selected one of the base quantum gates to the current quantum circuit based on an observation matrix, representing the operation of the current quantum circuit considered in the current iteration, and based on a reward function, and obtaining an updated quantum circuit for a next iteration;

calculating, by a training environment, for the next iteration, an updated observation matrix, representing the operation of the updated quantum circuit, and an updated reward function;

providing the updated observation matrix and the updated reward function to the agent for the next iteration, wherein the agent comprises, or is implemented through, a training neural network, and wherein determining an action by the agent comprises:

providing, as input to the training neural network, a vector of values representing said observation matrix;

providing by the agent, as output, a vector of parameter values representing said action;

wherein the training neural network encodes a policy for quantum compiling in hidden layers neurons, and wherein the policy to be applied for real time quantum compiling is the policy encoded in the training neural network at an end of the training phase.

15. The method according to claim 14, wherein the Deep Reinforced Learning is carried out by a Deep Q-Learning, (DQL), algorithm, and/or wherein the Deep Reinforced Learning is carried out by Proximal Policy Optimization, (PPO), algorithm, or wherein the reward function is a dense reward function, or wherein the reward function is a sparse reward function, exploiting a Hindsight Experience Relay (HER) technique.

16. The method according to claim 1, comprising a further step of implementing the quantum circuit determined by the quantum compilation in a quantum computation device.

17. A computer implemented method for performing quantum computing comprising:

determining, by a quantum computer or in a context of a quantum computation, a single-qubit or multi-qubit quantum operation to be carried out, represented by a respective unitary matrix;

providing said unitary matrix to a machine learning trained algorithm:

carrying out a computer implemented method for real time quantum compiling according to claim 1;

providing said information on the determined quantum circuit, as a result of the real time quantum compiling, to the quantum computer;

implementing the determined quantum circuit and executing the quantum operation, by the quantum computer.

18. A system comprising one or more computers and one or more storage devices storing instructions that are operable, when executed by the one or more computers, to cause the one or more computers to perform operations comprising the method of claim 1.

19. A non-transitory computer-readable storage medium comprising instructions stored thereon that are executable by a processing device and upon execution cause the processing device to perform operations comprising the method of claim 1.

20. A quantum computing system comprising:

a quantum computer comprising a control unit and a quantum computation unit, wherein the control unit is configured to generate a unitary matrix, representing a single-qubit or multi-qubit quantum operation to be carried out by the quantum computation unit, and is further configured to act on the quantum computation unit to generate a single-qubit or multi-qubit quantum circuit based on a received quantum circuit description information describing the quantum circuit in terms of a combination of base quantum gates, said generated quantum circuit corresponding to the operation of said unitary matrix, and wherein the quantum computation unit is configured to implement said quantum circuit, under the control of the control unit, and to perform said single-qubit or multi-qubit quantum operation by said quantum circuit;

a quantum compiler electronic processor configured to receive said unitary matrix from the control unit of the quantum computer, and to receive input information comprising information representing a base of quantum gates to be used as basic elements to build the quantum circuit, within a given tolerance, a tolerance parameter, representative of said given tolerance, and a processing termination information, wherein the quantum compiler electronic processor is further configured to carry out a computer implemented method for real time quantum compiling, according to claim 1, based on a machine-learning trained algorithm, and to provide the control unit of the quantum computer with said quantum circuit description information describing the determined quantum circuit in terms of a combination of base quantum gates, wherein said machine-learning trained algorithm operates based on a policy for the generation of quantum circuits in the machine-learning trained algorithm encoded in the machine-learning trained algorithm by a reinforced learning training phase, performed before and independently of the real time quantum compiling.

* * * * *